(12) United States Patent
Lübbers

(10) Patent No.: US 8,910,528 B2
(45) Date of Patent: Dec. 16, 2014

(54) VORTEX FLOWMETER AND ASSOCIATED FIBER DUCT

(71) Applicant: KROHNE Messtechnik GmbH, Duisburg (DE)

(72) Inventor: Wilhelm Lübbers, Börger (DE)

(73) Assignee: KROHNE Messtechnik GmbH, Duisburg (DE)

( * ) Notice: Subject to any disclaimer, the term of this patent is extended or adjusted under 35 U.S.C. 154(b) by 162 days.

(21) Appl. No.: 13/682,027

(22) Filed: Nov. 20, 2012

(65) Prior Publication Data

US 2013/0319133 A1 Dec. 5, 2013

(30) Foreign Application Priority Data

Nov. 21, 2011 (DE) .......................... 10 2011 118 921

(51) Int. Cl.
| | | |
|---|---|---|
| *G01F 1/20* | (2006.01) | |
| *G01B 9/02* | (2006.01) | |
| *G01F 1/32* | (2006.01) | |
| *G02B 6/24* | (2006.01) | |
| *G01F 1/37* | (2006.01) | |
| G02B 6/44 | (2006.01) | |
| G02B 6/36 | (2006.01) | |
| G02B 6/42 | (2006.01) | |

(52) U.S. Cl.
CPC .............. *G01F 1/375* (2013.01); *G01F 1/3245* (2013.01); *G02B 6/4444* (2013.01); *G02B 6/3616* (2013.01); *G02B 6/24* (2013.01); *G02B 6/4248* (2013.01); *G01F 1/3263* (2013.01)

USPC ........................................ 73/861.19; 356/482

(58) Field of Classification Search
None
See application file for complete search history.

(56) References Cited

U.S. PATENT DOCUMENTS

| | | | |
|---|---|---|---|
| 2,968,505 A | 1/1961 | Scaramucci | |
| 3,825,320 A | 7/1974 | Redfern | |
| 4,842,361 A | 6/1989 | Schrauder | |
| 4,899,046 A * | 2/1990 | Wright et al. | ............ 250/227.14 |
| 6,409,179 B1 | 6/2002 | Daoud | |
| 6,739,598 B1 | 5/2004 | Saarem | |
| 8,234,931 B2 | 8/2012 | Cheng et al. | |
| 8,687,199 B2 * | 4/2014 | Krisch | .......................... 356/482 |

FOREIGN PATENT DOCUMENTS

| | | |
|---|---|---|
| DE | 199 12 205 A1 | 9/2000 |
| DE | 10 2009 039 659 A1 | 3/2011 |

* cited by examiner

*Primary Examiner* — Harshad R Patel
(74) *Attorney, Agent, or Firm* — Roberts Mlotkowski Safran & Cole, P.C.; David S. Safran

(57) ABSTRACT

A vortex flowmeter having a optical fiber channel in the device wall, a first sealing element extending into the fiber channel with a contact surface for the optical fiber and at least a second sealing element with a contact surface for the optical fiber, wherein second sealing element being guided in a guide in the device wall. In a sealed state of the fiber fiber channel, the second sealing element is pressed against the contact surface of the first sealing element by a positioning means with the optical fiber located between the contact surfaces of the sealing elements and enclosed thereby, and in this manner, the fiber channel is closed by the first sealing element, the second sealing element and the optical fiber guided between the first sealing element and the second sealing element.

11 Claims, 2 Drawing Sheets

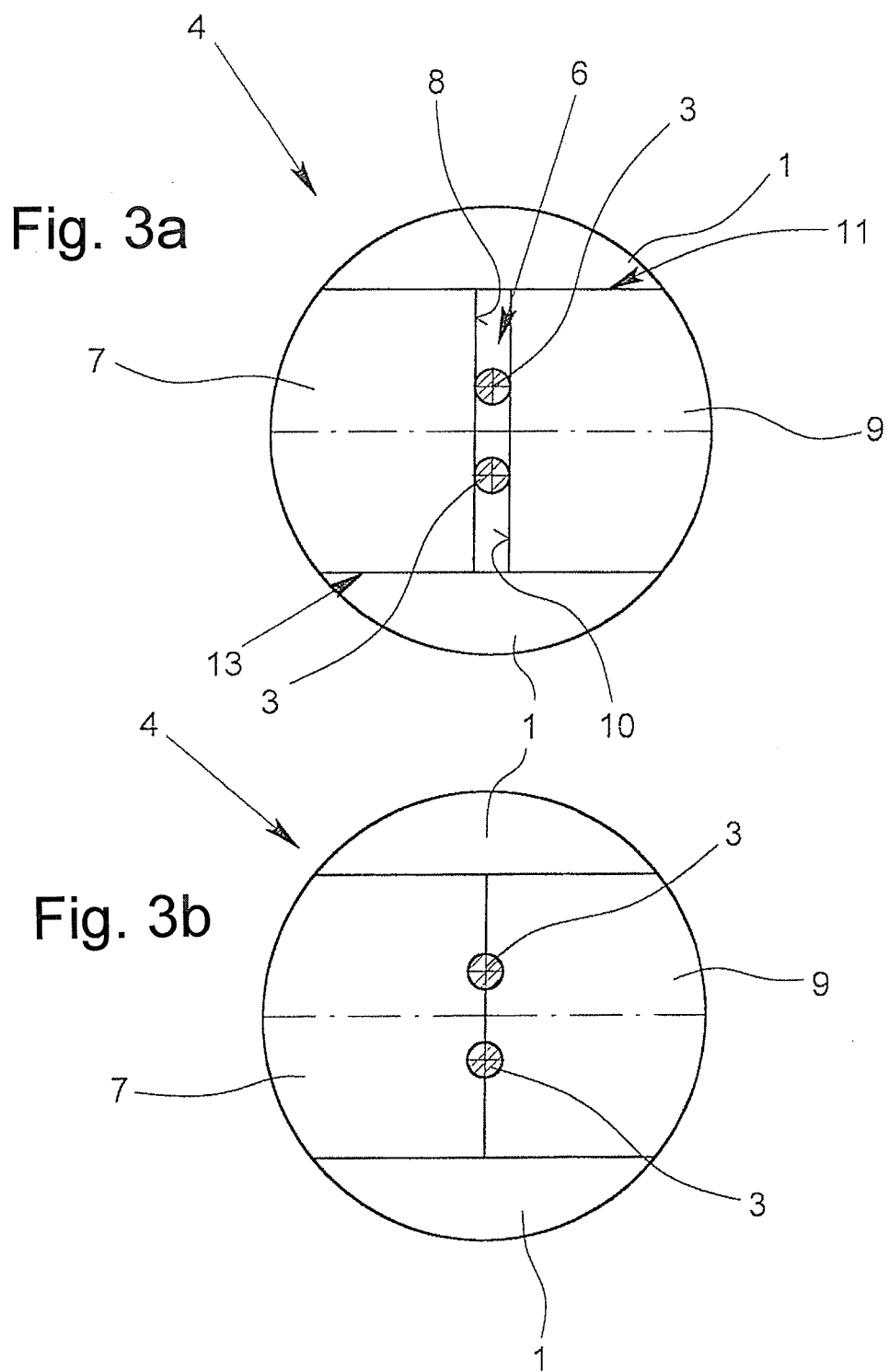

VORTEX FLOWMETER AND ASSOCIATED FIBER DUCT

BACKGROUND OF THE INVENTION

1. Field of the Invention

The invention relates to a vortex flowmeter having a medium chamber that can have a medium at least partially flowing through it and is defined by a device wall, at least one bluff body provided in the medium chamber and at least one pressure sensor provided in the effective range of the bluff body, wherein the deflection of the pressure sensor is used to metrologically detect the pressure in the medium next to the pressure sensor, wherein at least one optical fiber is arranged in and/or on the pressure sensor for measuring the deflection of the pressure sensor and wherein the optical fiber is guided from the medium chamber through a pressure-resistant fiber duct in the device wall into medium-free surroundings. Furthermore, the invention also relates to such a fiber duct.

2. Description of Related Art

Vortex flowmeters have been known for a long time, wherein the measuring principle is based on the fact that, in a fluid or gaseous medium, a vortex street is formed behind a bluff body that has a medium passing it, the vortex street being fowled by vortices stripped away from the bluff body moving along with the current. The frequency with which the vortices are stripped away from the bluff body is dependent on the velocity of the current, wherein this correlation is nearly linear under certain conditions. In any case, the measurement of the vortex frequency presents a suitable means for determining the velocity of the current of the medium, which is why it is indirectly—under additional consideration of, for example, pressure and temperature—possible to determine the volume and mass flow using the vortex frequency measurement. The vortices of the medium occurring in a vortex street lead to local pressure fluctuations that can be detected by pressure sensors. Such a pressure sensor can have an essentially level measuring diaphragm and has to be arranged in the vortex street so that the vortices created by the bluff body pass by the measuring diaphragm of the pressure sensor at least indirectly and, thus, can be detected. To this end, the pressure sensor can be provided downstream, behind the bluff body, but can also be formed in the actual bluff body or, for example, can be arranged above the bluff body, when the pressure sensor, for example, indirectly determines the pressure fluctuations of the vortex street via channels in the housing of the flowmeter.

Very different methods are known from the prior art for determining the deflection of the pressure sensor, often capacitive or inductive effects are used, and sometimes piezo-ceramics are used. It is also known from the prior art to use optical fibers for determining the movement of the pressure sensor, wherein, for example, designs are known in which the optical fiber runs practically perpendicular to the front of the measuring diaphragm of the pressure sensor and the diaphragm is supplied with light on its end face, this light being reflected by the measuring diaphragm and subsequently used for the detection of movement. Vortex flowmeters are also known from the prior art in which an optical fiber lies against the pressure sensor, wherein the optical fiber is deflected together with the pressure sensor when the sensor is subject to pressure or differential pressure, with the result that the optical fiber is stretched and/or compressed, i.e., the optical fiber experiences a change in length. Such a change in length can be optically evaluated, as is known, with great precision, for example, using a known method that is based on the interference of electromagnetic waves. Using this method, it is easily possible to reliably detect changes in length in a range of the wavelength of the electromagnetic waves used.

Optical fibers are comparably sensitive, in particular in view of bending and buckling, so that it is a particular challenge to provide a suitable fiber duct in the device wall for feeding the fiber from the medium chamber into the medium-free surroundings. Extreme conditions can prevail in the medium chamber in view of pressure (hundreds of bar), in view of temperature (hundreds of ° C.) and also in view of chemical aggressiveness of the medium. The fiber duct, thus, has to be suitable for withstanding these conditions, so that the medium-free surroundings, in which, for example, the evaluation electronics for the signal of the optical fiber are located, are reliably sealed off from the medium chamber.

It is known from the prior art to glue or to solder an optical fiber with a mechanically stable sealing element before installation, wherein in the latter case, metalized optical fibers have to be used (e.g., UK Patent GB 2 089 065 or also U.S. Pat. No. 3,825,320). This course of action is comparably complex since the optical fibers are usually not prepared by the producers of vortex flowmeters, rather have to be prepared with a suitable glued or soldered sealing element by a third party. Furthermore, optical fibers provided with such sealing elements cannot be flexibly used in view of their dimensions, since an optical fiber normally extends into the medium chamber of a vortex flowmeter in a looped manner and, in this respect, has to be provided with sealing elements on both ends of the fiber, so that a certain distance from sealing element to sealing element results on the optical fiber for every device variation and structural changes in view of positioning the pressure sensor are not possible when maintaining the sealing element distance. Furthermore, the installation of such fiber ducts is also mechanically comparably complex; the pressure sensor cannot be dismantled without removing the fiber duct from the device wall. The lack of flexibility in the length of the optical fibers produced in this manner also often leads to the occurrence of additional splice sites in the medium-free surroundings.

SUMMARY OF THE INVENTION

Thus, a primary object of the present invention is to provide a vortex flowmeter having a fiber duct for an optical fiber and a corresponding fiber duct, wherein the fiber duct does not require particular preparation of the optical fiber and is easy to produce.

The above object is achieved by a vortex flowmeter and by a fiber duct in which the fiber duct has a fiber channel in the device wall, a first sealing element extending into the fiber channel with a contact surface for the optical fiber and at least a second sealing element with a contact surface for the optical fiber, wherein the second sealing element is guided in a guide formed in the device wall and in the sealed state of the fiber duct, the second sealing element is pressed against the contact surface of the first sealing element by a positioning means in such a manner that the optical fiber located between the contact surface of the first sealing element and the contact surface of the second sealing element is enclosed by the contact surface of the first sealing element and/or the contact surface of the second sealing element, and in this manner, the fiber channel is closed by the first sealing element, the second sealing element and the optical fiber guided between the first sealing element and the second sealing element.

The fiber duct according to the invention does not require special preparation of the optical fiber, neither does a sealing element have to be slid onto the optical fiber nor does such a sealing element have to be joined with the fiber. In the fiber duct according to the invention, the optical fiber is virtually encompassed by the first sealing element from a first side and by the second sealing element from a second side, wherein the pressure applied to the second sealing element by the positioning means has to be at least large enough that the first sealing element and/or the second sealing element are deformed elastically and/or plastically until the optical fiber is enclosed in a sealed manner, and simultaneously, the contact surface of the first sealing element and the contact surface of the second sealing element are also tightly sealed against one another. This indicates that the contact surfaces for the optical fibers of the first sealing element and the second sealing element are not solely contact surfaces for the optical fibers, but rather are also contact surfaces for one another. All elements that are required for closing the fiber channel are included in the fiber duct with the exception, of course, of the actual optical fiber.

In an advantageous design of the invention, it is provided that also the first sealing element is guided in a guide formed in the device wall and can be positioned by a positioning means. This variation has the advantage that the fiber channel can be made completely available when, for example, the optical fiber is guided through the fiber channel during assembly. Furthermore, it has the advantage that the position of the optical fiber can be set in the fiber channel and can be adjusted to structural requirements.

In a further advantageous design of the invention, it is provided that, in the sealed state of the fiber duct, the first sealing element is tightly sealed with its guide and/or the second sealing element is tightly sealed with its guide. Such a sealing effect is, for example, present when the sealing elements in the sealed state, e.g., when pressure is applied with the positioning means, tightly seal along a circumference line with their guide. Normally, the contact surfaces of the sealing elements extend almost perpendicular to the linear movement defined by each guide of the sealing elements. The surface area or surface areas of the guide are normally oriented perpendicular to the contact area of the sealing elements. In such a design of the sealing elements, with the sealing elements pressing against one another with their contact surfaces, compression of the sealing elements is implemented in the direction of the applied force, which simultaneously leads to a spreading of the sealing element in a direction perpendicular to the applied force so that the wall or walls of the sealing element that face the wall or walls of each guide approach this wall or these walls of the guide and cause a sufficiently sealed form fit. The sealing elements and the guides in the housing associated with each sealing element are attuned to one another in such a manner that they form a fit with only very low over or undersize, so that good movement of the sealing elements in the respective guides is always guaranteed, but at the same time a good sealing effect is achieved even with low applied force.

In choosing the material for the first sealing element and/or the second sealing element, different limiting conditions have to be taken into consideration. On the one hand, the material should be sufficiently deformable at contact pressures that are not critical for optical fibers in order to be able to sufficiently enclose the optical fiber. The material has to be chemically stable relative to contact by the medium in the medium chamber, so that the sealing element is not put at risk of corrosion. Finally, the material of the sealing element has to be sufficiently pressure and temperature resistant. Materials with predominantly elastic characteristics (e.g., elastomers) are taken into consideration, but also materials with plastic or elasto-plastic characteristics as are found, for example, in some metals can be used.

Acrylonitrile butadiene rubber has been shown to be a suitable material for sealing elements in the case of oleaginous media and moderate temperature exposure. For applications in which a high thermal durability is required, fluoroelastomers have been shown to be suitable and perfluoroelastomers have been shown to be suitable as elastomers with a high chemical stability at mid thermal durability (up to ca. 300° C.).

In further designs of the invention, it has been shown to be advantageous when metals or metal alloys are used as material for the first sealing element and/or the second sealing element, wherein, here, tantalum is of particular interest, since it is sufficiently ductile, chemically extremely stable and very temperature resistant. For applications with less extreme requirements, silver or also silver alloys can be used or also other precious metals.

Of course, the fiber duct described here is not only suitable for vortex flowmeters, but it is also possible to use the fiber duct described in detail above in other devices or in walls of other devices.

In detail, there is a plurality of possibilities for designing and further implementing the vortex flowmeter and the fiber duct according to the invention, as will be apparent from the following description of an embodiment in conjunction with the accompanying drawings.

DETAILED DESCRIPTION OF THE INVENTION

Figure 1:
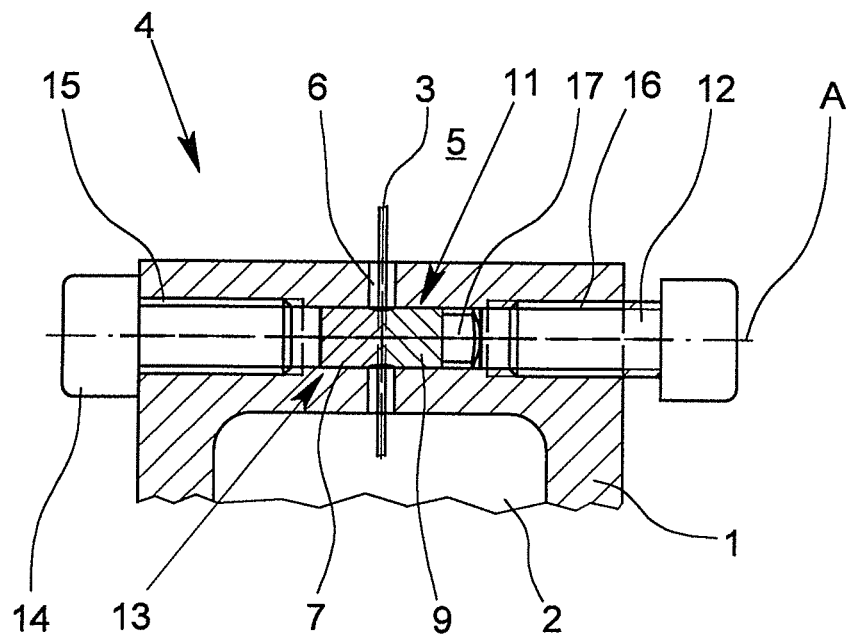
FIG. 1 is a cross-sectional view of a fiber duct according to the invention in the device wall of a vortex flowmeter.
Figure 2:
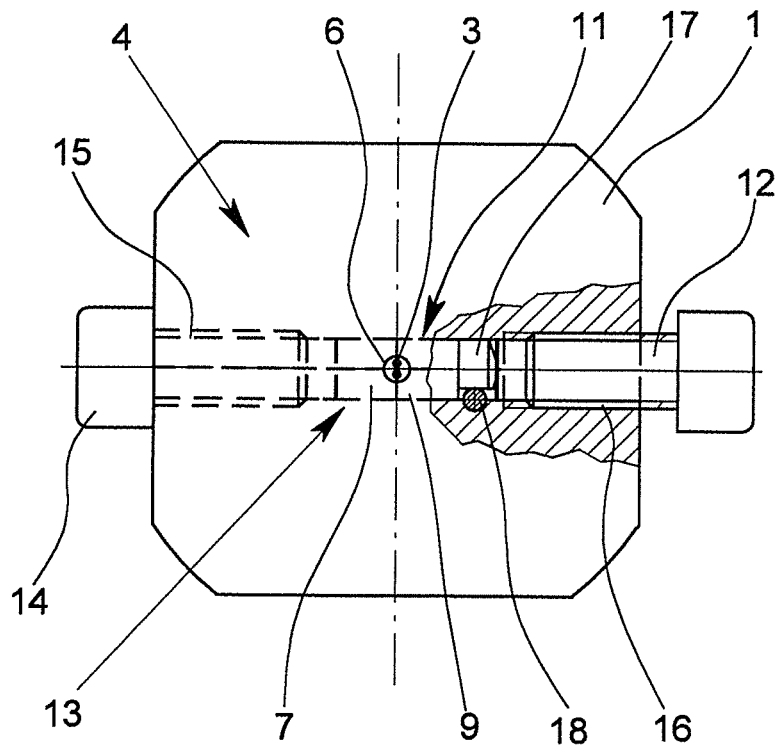
FIG. 2 is a partial sectional top view of the fiber duct according to FIG. 1, and FIGS. 3a & 3b show the fiber channel of a fiber duct according to the invention in the unsealed state and sealed states, respectively.

In FIGS. 1 to 3, sections of a vortex flowmeter that concentrate on the essence are shown having a medium chamber 2 that can have medium at least partially flowing through it and that is defined by the device walls 1. What cannot be seen here is the bluff body normally provided in the medium chamber 2 and what is also not seen is the pressure sensor that is always provided in vortex flowmeters, whose deflection is used for metrologically detecting the pressure in the medium neighboring the pressure sensor. However, the optical fiber 3, which is joined to the pressure sensor in a suitable manner and that is required for determining the deflection of the pressure sensor is shown in the figures that, the optical fiber 3 being guided from the medium chamber 2 through a pressure resistant fiber duct 4 in the device wall 1 into medium-free surroundings 5.

The fiber duct 4 has a fiber channel 6 in the device wall 1, a first sealing element 7 extending into the fiber channel 6 with a contact surface 8 for the optical fiber 3 and at least a second sealing element 9 having a contact surface 10. The second sealing element 9 is presently guided in a guide 11 formed in the device wall 1, wherein the second sealing element 9, in the sealed state of the fiber duct 4, is pressed against the contact surface 8 of the first sealing element 7 with its contact surface 10 by a positioning means 12 in such a manner that the optical fiber 3 is enclosed between the contact surface 8 of the first sealing element 7 and the contact surface 10 of the second sealing element 9. In this manner, the fiber channel 6 is closed by the first sealing element 7, the second sealing element 9 and the optical fiber 3 guided between them.

In FIG. 3a, it is shown how the fiber duct 4 looks in a unsealed state in which, here, the contact surfaces 8, 10 of the first sealing element 7 and the second sealing element 9 come into contact with opposite sides of the optical fiber 3 or optical fibers 3. By applying a force to the sealing elements 7, 9 in the direction of the optical fiber 3, the remaining gap in the fiber channel 6 is closed, the sealing elements being plastically or elastically deformed so as to enclose the optical fibers 3 with their contact surfaces 8, 10. By all means, the optical fibers 3 are able to withstand such a mechanical load, provided that a suitable elastic and/or plastic material is chosen for the sealing elements 7, 9. The contact surfaces 8, 10 of the sealing elements 7, 9 enclose not only the optical fibers 3, but also come into contact with one another, and thus, seal the gap between them.

In a further embodiment of the invention, which is not shown here, it is provided that that edges of at least one of the contact surfaces are slightly recessed relative to the medium chamber and to the medium-free surroundings in order to prevent disconnection or shearing of the optical fiber; then, the contact surface of the respective sealing element is, for example, slightly convex in shape.

As can be seen in FIGS. 1 & 2, the first sealing element 7 is also guided in a guide 13 formed in the device wall 1 and can also be positioned in the guide 13 using a positioning means 14. The first sealing element 7 and the second sealing element 9 are fitted into each of their respective guides 11, 13 so tightly that, in the sealed state of the fiber duct 4, the first sealing element 7 is tightly sealed with its guide 13 and the second sealing element 9 is tightly sealed with its guide 11. This effect is not only achieved by a suitable fitting of the sealing elements 7, 9 in the guides 13, 11, but also, in particular, by compression of the sealing elements 7, 9 in the direction of the force applied by the positioning means 12 and the associated radial spreading of the sealing elements 7, 9 against the walls of the guides 11, 13.

In the present case, the guide 13 of the first sealing element 7 and the guide 11 of the second sealing element 9 exptend perpendicular to the fiber duct 4, and thus, relative to the fiber channel 6, wherein the guide 13 of the first sealing element 7 and the guide 11 of the second sealing element 9 lie on a common axis A, wherein the guide 13 of the first sealing element 7 and the guide 11 of the second sealing element 9 can be formed as drilled holes.

The positioning means 14 for the first sealing element 7 and the positioning means 12 for the second sealing element 9 each is formed of a threaded rod or of a machine screw, and each of which is guided in an internal thread 15, 16 provided in the device wall 1. Each internal thread 15, 16 coaxial with the axis A of the guide 11, 13 of each associated sealing element 7, 9. In the present case, the guides 11; 13 and the drilled holes of the internal threads 15, 16 result from a single through-hole.

A pressure piece 17 is arranged between the positioning means 12 for the second sealing element 9 and the second sealing element 9 that is secured against turning with a pin 18, so that practically no torque can be transferred to the second sealing element 9 by the positioning means 12. The pressure piece 17 thus allows for a linear movement along the guide 11 of the second sealing element 9, however, it blocks a turning movement around the axis A of the linear movement. This is important because a turning of the second sealing element 9 would lead to destruction of the optical fiber 3 when the second sealing element 9 is pressed onto the first sealing element 7. Of course, additionally or alternatively, a pressure piece can be provided between the positioning means 14 for the first sealing element 7 and the first sealing element 7; in this case it doesn't matter which positioning means 12, 14 sets the position of the optical fiber 3 in the fiber channel 6 and with which positioning means 12, 14 subsequently the application of pressure on the sealing element 7, 9 occurs.

In the illustrated embodiment, the first sealing element 7 and the second sealing element 9 are made of tantalum, so that the implemented fiber duct 4 has an overall high pressure and thermal durability as well as stability against chemical corrosion.

What is claimed is:

1. In a vortex flowmeter of the type having a medium chamber through which a medium is at least partially flowable and which is defined by a device wall, at least one bluff body provided in the medium chamber and at least one pressure sensor provided in an effective range of the bluff body for metrologically detecting the pressure in the medium in an area next to the pressure sensor, and at least one optical fiber arranged for measuring deflection of the pressure sensor and being guided from the medium chamber through a fiber channel in the device wall into medium-free surroundings, the improvement comprising:
    a first sealing element extending into the fiber channel and having a contact surface for contacting the optical fiber at a first side thereof,
    at least a second sealing element having a contact surface for contacting the optical fiber at a second side thereof, the second sealing element being guided in a guide formed in the device wall, and
    a positioning means adapted for pressing the second sealing element against the contact surface of the first sealing element with the optical fiber located therebetween in such a manner that the contact surface of the first sealing element and the contact surface of the second sealing element enclose the optical fiber and close the fiber channel in a sealed state thereof.

2. Vortex flowmeter according to claim 1, wherein the first sealing element is guided in a guide formed in the device wall and wherein a second positioning means is provided for positioning the first sealing element.

3. Vortex flowmeter according to claim 2, wherein in the sealed state of the fiber channel, at least one of the sealing elements is tightly sealed relative to the respective guide thereof.

4. Vortex flowmeter according to claim 2, wherein the guides extend perpendicular to the fiber channel, the guide for the first sealing element and the guide the second sealing element being coaxial.

5. Vortex flowmeter according to claim 2, wherein at least one of the positioning means comprises a threaded rod received in an internal thread provided in the device wall.

6. Vortex flowmeter according to claim 5, wherein a pressure piece is arranged between at least one of the positioning means for the first sealing element and the first sealing element and the positioning means for the second sealing element and the second sealing element.

7. Vortex flowmeter according to claim 1, wherein at least one of the first sealing element and the second sealing element is made of an elastomer.

8. Vortex flowmeter according to claim 7, wherein said elastomer is one of an acrylonitrile butadiene rubber, a fluoroelastomer and a perfluoroelastomer.

9. Vortex flowmeter according to claim 7, wherein said metal or an alloy comprises, at least in part, at least one of tantalum and silver.

10. Vortex flowmeter according to claim 1, wherein at least one of the first sealing element and the second sealing element is made at least in part of a metal or an alloy.

11. Fiber duct for sealing an optical fiber in a feed channel formed in a device wall, comprising:
- a first sealing element extending into the fiber channel and having a contact surface for contacting the optical fiber at a first side thereof,
- at least a second sealing element with a contact surface for contacting the optical fiber at a second side thereof, the second sealing element being guided in a guide formed in the device wall, and
- a positioning means adapted for pressing the second sealing element against the contact surface of the first sealing element with the optical fiber located therebetween in such a manner that the contact surface of the first sealing element and the contact surface of the second sealing element enclose the optical fiber and close the fiber channel in a sealed state thereof.

* * * * *